US010853789B2

(12) United States Patent
Votaw et al.

(10) Patent No.: US 10,853,789 B2
(45) Date of Patent: Dec. 1, 2020

(54) DYNAMIC DIGITAL CONSENT (71) Applicant: Bank of America Corporation, Charlotte, NC (US)

(72) Inventors: Elizabeth S. Votaw, Potomac, MD (US); David J. Smiddy, Chadds Ford, PA (US); Fnu Sidharth, Charlotte, NC (US); Stephen T. Shannon, Charlotte, NC (US); James Alexander, Dripping Springs, TX (US)

(73) Assignee: Bank of America Corporation, Charlotte, NC (US)

( * ) Notice: Subject to any disclaimer, the term of this patent is extended or adjusted under 35 U.S.C. 154(b) by 364 days.

(21) Appl. No.: 15/643,533

(22) Filed: Jul. 7, 2017

(65) Prior Publication Data
US 2019/0012653 A1    Jan. 10, 2019

(51) Int. Cl.
*G06Q 20/32* (2012.01)
*H04L 29/06* (2006.01)
(Continued)

(52) U.S. Cl.
CPC ....... *G06Q 20/3223* (2013.01); *G06Q 20/123* (2013.01); *G06Q 20/4012* (2013.01);
(Continued)

(58) Field of Classification Search
CPC ............ G06Q 20/3223; G06Q 20/4012; H04L 63/08; H04W 4/14
(Continued)

(56) References Cited

U.S. PATENT DOCUMENTS 6,105,007 A    8/2000 Norris
8,191,776 B2    6/2012 Ben-Zvi et al.
(Continued)

FOREIGN PATENT DOCUMENTS

CA        2732624 A1 *  1/2010  ............ G06Q 30/02

OTHER PUBLICATIONS

Title: Research on E-business Identity Authentication System Based on Improved One-time Password Author: Li Yan, School of Management, Jiangxi Science & Technologe Normal University 2008 IEEEE (Year: 2008).*
(Continued)

*Primary Examiner* — Christopher Bridges
*Assistant Examiner* — Yongsik Park
(74) *Attorney, Agent, or Firm* — Weiss & Arons LLP; Michael A. Springs, Esq.

(57) ABSTRACT

A method for enhancing customer authentication and consent for finalizing an offer to a customer of a product and/or a service is provided. The method may include using a first receiver to receive an authentication request from an initiator. The authentication request may include a customer name and a customer phone number. The method may also include using a first processor to generate a pin number and transmit the pin number to the customer phone number. The pin number may include an identifier associated with the product and/or service. The method may further include using a second receiver, included in a mobile phone, to receive the pin number, and using a second processor, included on the mobile phone, to authenticate the pin number. The authentication may include verifying a match between the customer phone number and a mobile phone number associated with the mobile phone.

20 Claims, 4 Drawing Sheets

(51) Int. Cl.
*G06Q 20/40* (2012.01)
*H04W 4/14* (2009.01)
*G06Q 20/12* (2012.01)

(52) U.S. Cl.
CPC .......... *H04L 63/08* (2013.01); *H04L 63/0853* (2013.01); *H04L 63/0861* (2013.01); *H04W 4/14* (2013.01)

(58) Field of Classification Search
USPC .......................................................... 705/44
See application file for complete search history.

(56) References Cited

U.S. PATENT DOCUMENTS

| | | | | |
|---|---|---|---|---|
| 8,627,424 | B1* | 1/2014 | O'Malley | H04L 63/0838 |
| | | | | 726/6 |
| 8,738,527 | B2 | 5/2014 | Kalinichenko et al. | |
| 9,558,480 | B2* | 1/2017 | Browne | G06Q 20/00 |
| 2004/0185827 | A1* | 9/2004 | Parks | H04W 4/24 |
| | | | | 455/406 |
| 2007/0244816 | A1 | 10/2007 | Patni et al. | |
| 2008/0301057 | A1* | 12/2008 | Oren | H04L 63/0428 |
| | | | | 705/71 |
| 2011/0078025 | A1* | 3/2011 | Shrivastav | G06Q 20/385 |
| | | | | 705/14.64 |
| 2011/0302627 | A1* | 12/2011 | Blom | H04L 63/18 |
| | | | | 726/2 |
| 2012/0129492 | A1* | 5/2012 | Mechaley, Jr. | G06Q 20/385 |
| | | | | 455/411 |
| 2016/0277439 | A1* | 9/2016 | Rotter | H04W 12/06 |
| 2017/0041296 | A1* | 2/2017 | Ford | H04L 63/0421 |
| 2017/0148009 | A1* | 5/2017 | Perez Lafuente | G06Q 20/3821 |

OTHER PUBLICATIONS

"Digital Onboarding with Consent to Use Customer Data," Retrieved from http://www.trunomi.com/solving-online-account-opening/: Apr. 30, 2015.

"GDPR, PSD2 & Epirvacy: New Regulations Will Drive Financial Services Innovation," Retrieved from http://www.trunomi.com/gdpr-psd2-eprivact-new-regulations-will-drive-financial-services-innovation/, Mar. 13, 2017.

* cited by examiner

DYNAMIC DIGITAL CONSENT

FIELD OF TECHNOLOGY

Aspects of the invention relate to enhancing customer authentication systems and methods. Specifically, the invention relates to enhancing customer authentication using data and applications stored on a customer's mobile phone.

BACKGROUND

Many products and services require authenticating a customer's identity. Robust customer authentication is important for security purposes and to ensure that the proper individual is receiving the product and/or service. Many of these products and services also require the customer to consent to terms and conditions prior to the customer receiving the product and/or service. These requirements may be administrative requirements or requirements of the product/service provider.

Authenticating a customer's identity can be difficult and cumbersome. Additionally, it can be difficult for a sales representative to remember to obtain the appropriate customer consent. Furthermore, even when consent is obtained, a record of the consent can sometimes be lost. Failure to properly authenticate a customer and/or obtain or record the appropriate consent can expose the product/service provider to regulatory, or other, penalties.

Today, many people carry a mobile phone with them throughout the day. Most mobile phones have internet connection and support a plurality of functionalities. Additionally, many people's mobile phones store a large amount of personal data relating to their users, such as user location, motion, pictures, documents, etc.

It would be desirable, therefore, to provide systems and methods for using data and functionalities stored on a customer's mobile phone to assist a product/service provider in authenticating the customer's identity. This is desirable at least because mobile phone data can potentially include a wealth of customer-specific data and, in these instances, assist the provider in establishing robust customer authentication protocols.

It would be further desirable to use a customer's mobile phone to obtain consent to terms and conditions of the product/service. This is desirable at least because digital transmission and receipt of customer consent can be easily tracked and saved, creating robust digital records of compliance with any applicable administrative and/or regulatory requirements.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Aspects of the invention relate to enhancing customer authentication and consent for finalizing an offer to a customer. The offer may be a product. The offer may be a service. The offer may be a product and/or a service. The product/service may be offered by a business, a governmental body, an educational institution, a financial institution, a regulatory agency, or any other suitable organization or vendor. Exemplary products/services may include credit cards, bank accounts, veteran's benefits, food stops and/or airport security checks.

The method may include using a first receiver to receive an authentication request from an initiator. An authentication request may be a request to verify that the customer applying for the product/service has provided true and accurate identifying information, such as his name, address, etc.

The method may include using a first receiver to receive a consent request from an initiator. A consent request may be a request to electronically transmit to the customer terms and/or conditions. The terms/conditions may be terms and conditions that the customer is required to consent to prior to being offered, or receiving, the product/service. The terms/conditions may be a business regulation, regulatory requirement, legal requirement, or any other requirement.

The method may include using the first receiver to receive both an authentication request and a consent request from the initiator.

The initiator may transmit the request to the first receiver during an onboarding process executed by the initiator prior to offering the customer the product/service. The initiator may transmit the request to the first receiver prior to beginning an application process for the customer. The initiator may transmit the authentication request to the first receiver after extending an offer to the customer pending the customer's authorization using the systems and methods of the invention.

The authentication request may include a customer name. The authentication request may include an identifier. The identifier may be associated with the product/service that the initiator is considering offering the customer.

The authentication request may include a customer phone number. The customer phone number may be a phone number provided by the customer to the initiator. The customer phone number may be a customer phone number electronically associated with the customer in a customer online profile, in a governmental database, in business records, or any other suitable location.

The consent request may include the customer name and/or the customer phone number. The consent request may include the identifier.

The method may include using a first processor to generate a pin number in response to the received authentication and/or consent request. The pin number may be a one-time pin ("OTP"). For the purposes of the application, a OTP may be a pin created for a customer to use once. The method may also include using a transmitter to transmit the pin number to the customer phone number. The pin number may be transmitted to the customer phone number by text, e-mail, phone call or any other suitable method.

The first receiver, the first processor and the first transmitter may be included in a PIN generation engine. The pin number generated by the PIN generation engine may include the identifier.

The method may include a mobile phone. The mobile phone may include a second receiver and a second processor.

The method may include using the second receiver to receive the pin number. The pin number may be received by the mobile phone via text, e-mail, a phone call, or any other suitable method.

The pin number may be input, by the customer, into the mobile phone. The pin number may be input into a webpage displayed by a screen included in the mobile phone. The pin number may be input into an application resident on the mobile phone.

The method may include using the second processor to authenticate the pin number. The authentication may include verifying a match between the customer phone number and a mobile phone number associated with the mobile phone. The authentication may include establishing that the pin number was input into the mobile phone within a predetermined time period. The predetermined time period may commence when the first transmitter transmits the pin number to the mobile phone, and terminate after a predetermined length of time thereafter.

The method may include using the second processor to retrieve, from a database, a first authentication method, a second authentication method, and a consent text. The method may include using the second processor to retrieve, from a database, a first authentication method and a second authentication method. The first authentication method, the second authentication method and the consent text may each be associated with the identifier.

The database may store a plurality of identifiers. Each identifier may be associated with one, two, three or more authentication methods. Each authentication method may include one, two, three or more authentication procedures. A first identifier and a second identifier may each be associated with the same authentication methods. A first identifier and a second identifier may each be associated with different authentication methods.

The first authentication method may include one, two, three, four or more authentication procedures. Exemplary authentication procedures may include a biometric scan, a match between data submitted by the customer and data stored on the customer's cell phone, a match between data submitted by the customer and data stored on one or more of the customer's online profiles, and any other suitable authentication procedure. The first authentication method may include a first authentication threshold. The first authentication threshold may define how the customer must satisfy each of the authentication procedures in order to be determined to be authenticated by the first authentication method.

The second authentication method may include one, two, three, four or more authentication procedures. Exemplary authentication procedures may include a biometric scan, a match between data submitted by the customer and data stored on the customer's cell phone, a match between data submitted by the customer and data stored on one or more of the customer's online profiles, and any other suitable authentication procedure. The second authentication method may include a second authentication threshold. The second authentication threshold may define how the customer must satisfy each of the authentication procedures in order to be determined to be authenticated by the second authentication method.

In some embodiments, the first authentication method may include a biometric scan. The second authentication method may not include the biometric scan. In some of these embodiments, the second authentication threshold may be higher than the first authentication threshold. For example, the second authentication threshold may include additional authentication procedures, a higher match between submitted customer data and customer data stored on the mobile phone, the customer's online profiles, or in any other location.

The method may include displaying, to the customer, the consent text. The method may include using the second receiver to receive a first customer selection evidencing the customer's agreement to terms and conditions included in the consent text.

The method may include using the second receiver to receive a second customer selection of one of the first authentication method and the second authentication method. The method may include using the second processor to authenticate the customer based on the selected one of the first and second authentication methods.

Upon authentication of the customer via the selected authentication method, the method may include transmitting to the initiator a message stating that the customer's identity has been authenticated and/or that his consent to terms and conditions associated with the product/service has been received. The initiator may store the message in a database. The database may be used to keep records of the customers consent and/or authentication.

The method may include, when the second processor determines that the customer has satisfied the first threshold, using a second transmitter to transmit an electronic offer to the customer. The electronic offer may provide the customer an option to enroll in the product and/or service.

The method may include, when the second processor determines that the customer has satisfied the second threshold, using a transmitter to transmit an electronic offer to the customer. The electronic offer may provide the customer an option to enroll in the product and/or service.

The method may include maintaining a database. The database may be in electronic connection with the website or application running on the mobile phone. The database may store a plurality of plurality of identifiers. Each identifier may be associated with one of a plurality of products and/or services. The method may also include associating each of the identifiers with one or more authentication methods and one or more consent texts.

In exemplary embodiments, the first authentication threshold may include establishing a match between stored customer data and customer data resident on the mobile phone and establishing a match between stored customer biometric data and biometric data generated by the biometric scan.

In exemplary embodiments, the method may include when the second receiver receives a second customer selection of the first authentication method, using the second processor to determine that the customer has satisfied the first threshold. Satisfying the first threshold may include using the second processor to establish a match between the stored customer data and the customer data resident on the mobile phone. Satisfying the first threshold may include using the second processor to establish the match between the stored customer biometric data and the generated biometric data.

In exemplary embodiments, the second authentication threshold may include establishing a match between stored customer data and customer data resident on the mobile phone.

In exemplary embodiments, when the second receiver receives a second customer selection of the second authentication method, the method may include the second processor to determine that the customer has satisfied the second threshold. Satisfying the second threshold may include using the second processor to establish a match between the stored customer data and the customer data resident on the mobile phone. Satisfying the second threshold may include using the second processor to establish a match between a phone number stored on a website profile associated with the customer and the customer phone number. Satisfying the second threshold may include using the second processor to establish a match between historical customer location data stored on the mobile phone and a customer address.

In some embodiments, the pin number generated by the PIN generation engine may not be a one-time pin. Instead, the pin number may be used by the customer two, three or more times, during a predetermined time period. The time period may be one day, two days, a week, two weeks, three weeks, one month, or any other suitable time period.

In some of these embodiments, a customer may input the pin number into his mobile phone and execute a customer selection indicating his consent to terms and conditions associated with a product/service. The customer may then log out of the application/website.

The method may include the application/website transmitting an electronic message to the initiator to confirm that the customer has consented to the terms and conditions. The consent data may be stored and archived in a database. The consent data may be associated with one, two, or all of the customer's name, mobile phone number and pin number.

The customer may, at a later point in time, re-input the pin number into the application/website, and select and execute an authentication method. At that later point in time, the application/website may determine whether or not the time period has lapsed. If the time period did not lapse, the application/website may begin the selected authentication process. If the time period did lapse, the application/website may not begin the authentication process. A message may be displayed to the customer, informing the customer of the requirement to contact the initiator again to re-start the application process for the product/service.

In the event that the time period did not lapse, the application/website may initiate and complete a selected authentication process. Upon completion of the authentication process, the application may transmit a message to the initiator that the authentication has been completed. The method may include associating the authentication with the consent. The authentication may be associated with the consent using the stored pin number, customer name and/or mobile phone number. The method may include offering the customer the product/service after the customer has satisfied the consent and authentication requirements.

In some embodiments, when the customer consents to the terms and conditions and subsequently logs out of the application/website, the application/website may gather a first set of metadata associated with the customer's mobile phone. For example, the application/website may determine how many contacts the mobile phone has, the data usage of the phone, applications run on the phone, the type of mobile phone that the customer has, etc. The application/website may transmit the first set of metadata data to the initiator together with data confirming that the customer has consented to the terms and conditions.

At a later point in time, when the customer re-enters his pin number into the application/website and the application/website authenticates his identity, the application/website may gather a second set of metadata associated with the customer's mobile phone. The second set of metadata may include metadata detailed above. The application/website may transmit the second set of metadata to the initiator, in addition to a confirmation that the customer has been authenticated.

The method may include comparing the first set of metadata to the second set of metadata. In the event that the first set of metadata differs from the second set of metadata by a predetermined amount, the authentication/confirmation process may be terminated. The initiator may be required to re-start the authentication/confirmation procedure as detailed herein.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of the methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
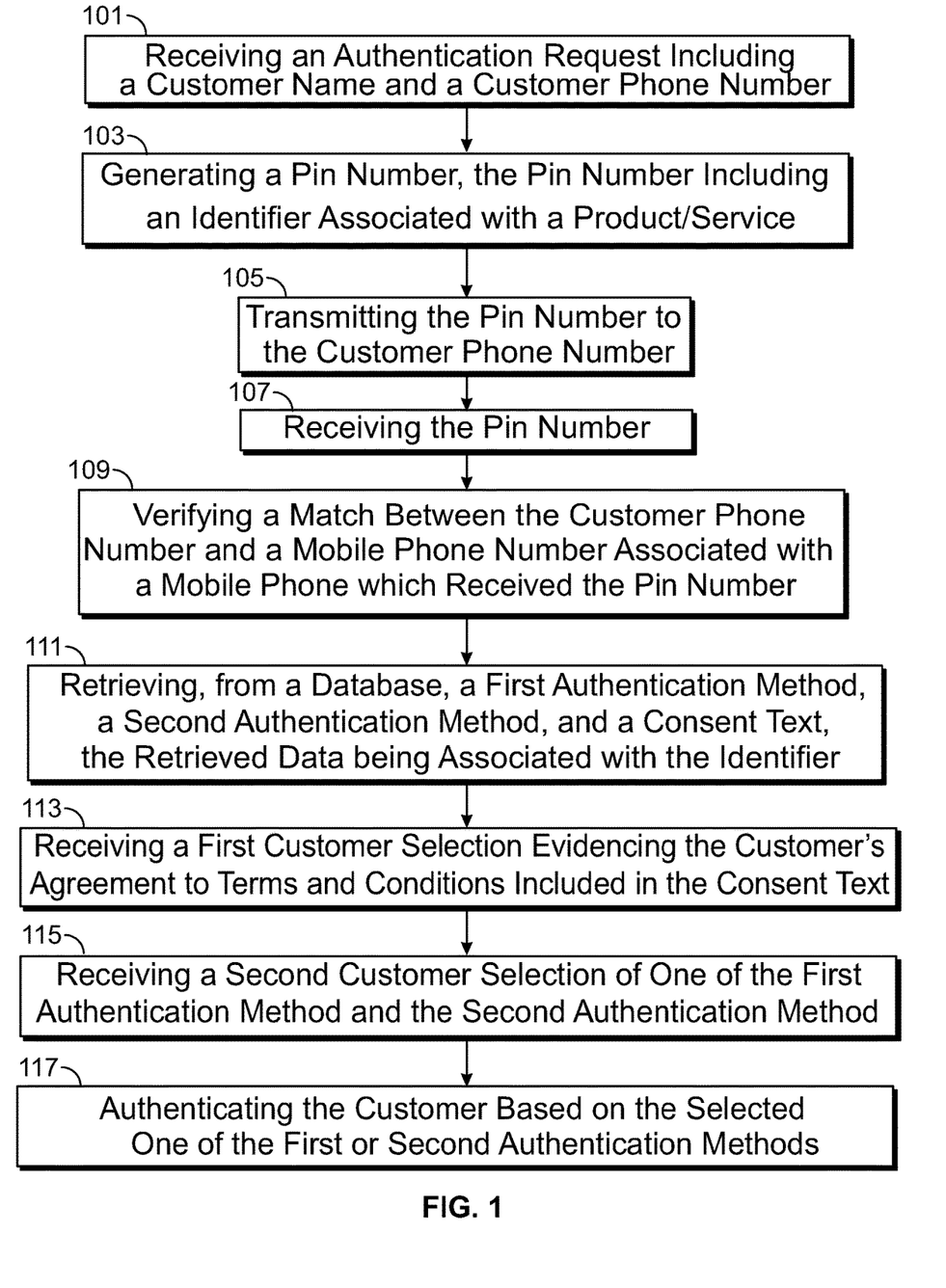
FIG. 1 shows an illustrative method in accordance with principles of the invention.

FIG. 1 shows an illustrative method 100 in accordance with the invention. Method 100 may include one, two or more of steps 1-9. Method 100 may include one, two or more steps not shown in FIG. 1 but described herein.

At step 101, method 100 may include receiving an authentication request including a customer name and a phone number. At step 103, the method may include generating a pin number. The pin number may include an identifier associated with a product/service. The method may include, at step 105, transmitting the pin number to the customer phone number.

The method may include, at step 107, receiving the pin number. At step 109, the method may include verifying a match between the customer phone number and a mobile phone number associated with a mobile phone. The mobile phone may be the mobile phone that received the pin number.

The method may include, at step 111, retrieving, from a database, a first authentication method, a second authentication method and a consent text. The retrieved data may be associated with the identifier.

The method may include, at step 113, receiving a first customer selection. The first customer selection may evidence the customer's agreement to terms and conditions included in the consent text.

At step 115, the method may include receiving a second customer selection of one of the first authentication method and the second authentication method. The method may include, at step 117, authenticating the customer based on the selected one of the first or second authentication methods.

Figure 2:
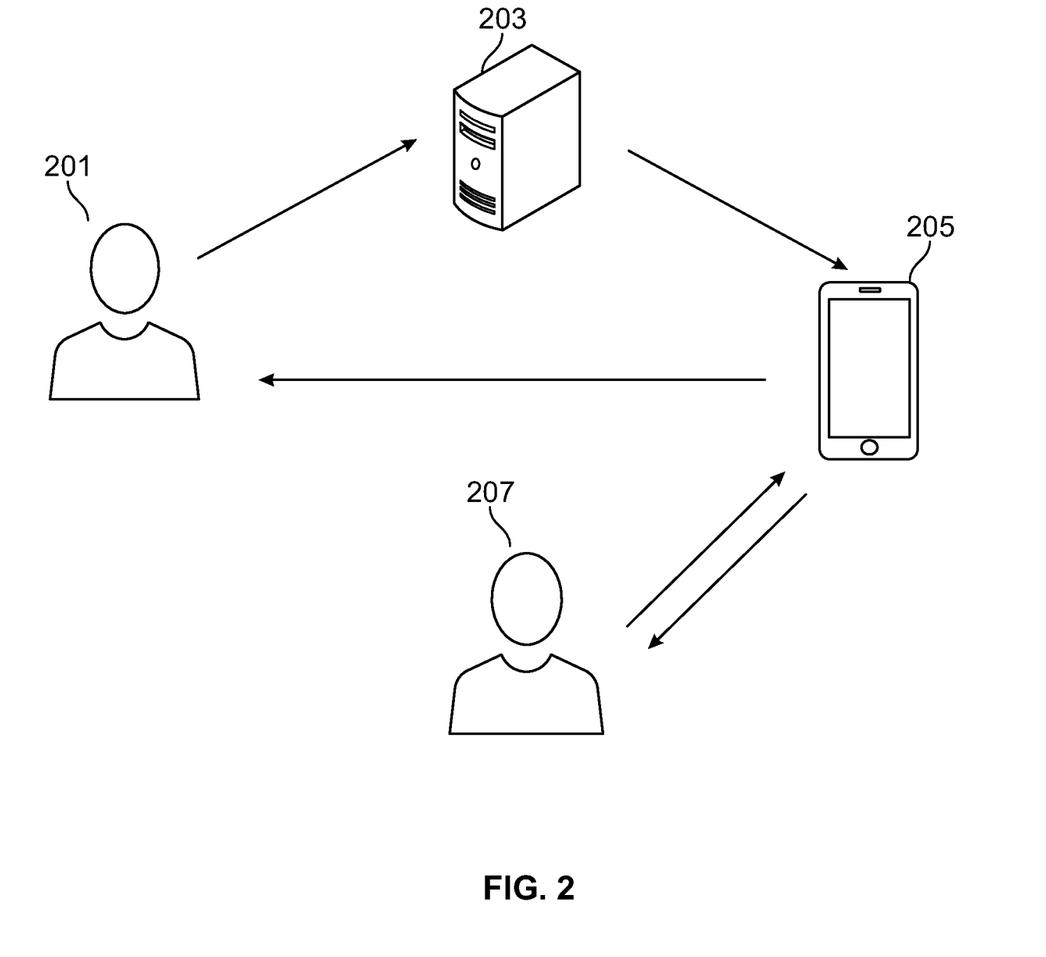
FIG. 2 shows illustrative system architecture in accordance with principles of the invention.

FIG. 2 shows an illustrative system architecture in accordance with the invention. The system architecture may include initiator 201, PIN generation engine 203, mobile phone 205, and customer 207.

Initiator 201 may use an electronic device, such as a computer, tablet, cell phone, or any other suitable device to electronically communicate with PIN generation engine 203. Initiator 201 may transmit to PIN generation engine 203 a request to generate a pin number for customer 207. The request may include an identifier. The identifier may identify the product/service that initiator 201 is contemplating offering to customer 207.

PIN generation engine 203 may be in electronic communication with mobile phone 205. PIN generation engine 203 may transmit to mobile phone 205 a pin number generated in response to initiator 201's request. PIN generation engine 203 may transmit the pin number to mobile phone 205 using text messaging, e-mail, a posting on a social media page of customer 207, or using any other suitable transmission mechanism.

Mobile phone 205 may receive the pin number from PIN generation engine 203. Customer 207 may receive data from, and input data into, mobile phone 205. Customer 207 may view the pin number, and input into a website or application the pin number.

The website or application may authenticate the pin number and, after authentication, display a webpage to the customer one or both of a first and second authentication method and/or consent text.

When the customer has successfully passed the first or second authentication threshold, the website or application may transmit to initiator 201 a message confirming the authentication of customer 207. When the customer fails to pass the first or second authentication threshold, the website or application may transmit to initiator 201 a message indicating that customer 207 failed to pass the first or second authentication threshold.

Figure 3:
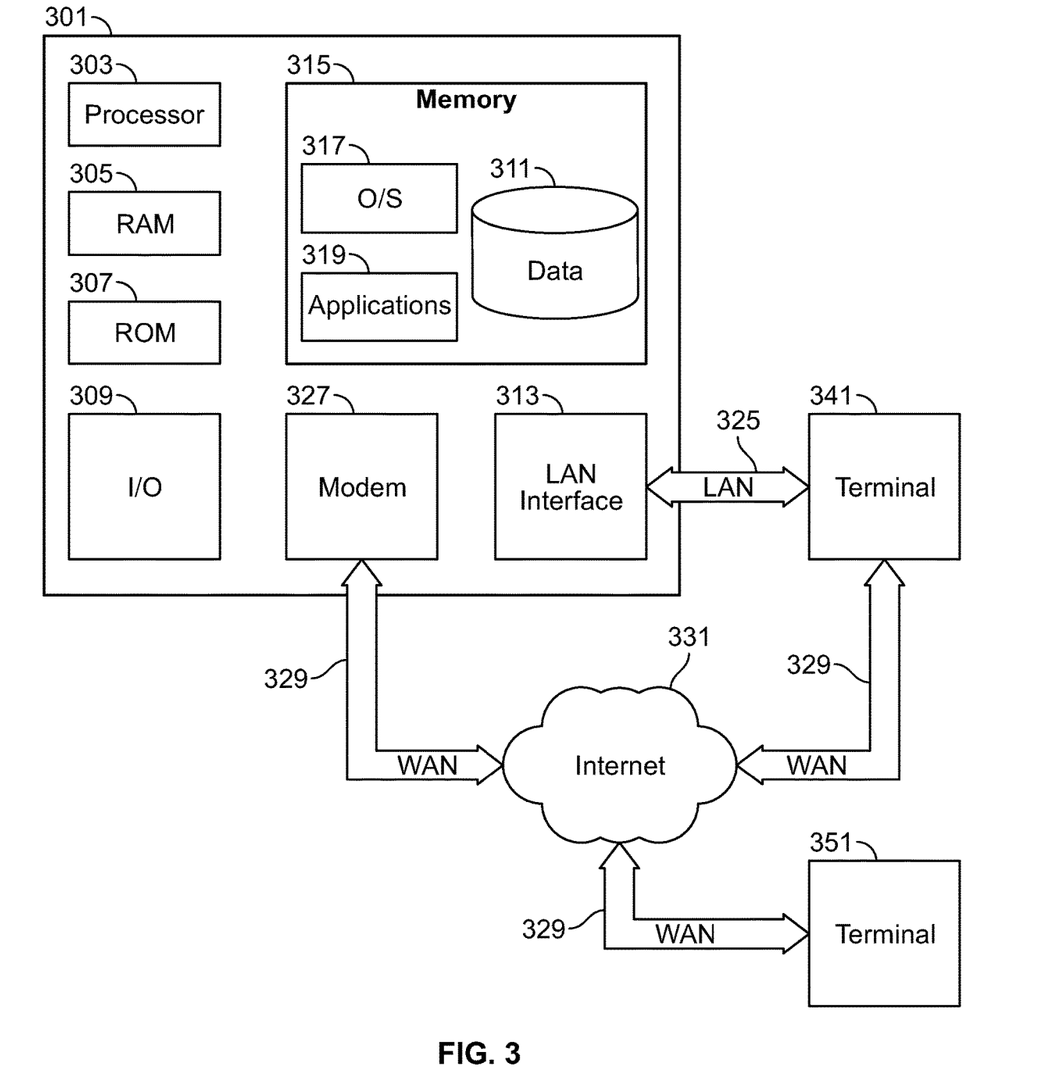
FIG. 3 shows illustrative apparatus in accordance with principles of the invention.

FIG. 3 is a block diagram that illustrates computing device 301 (alternately referred to herein as a "server") that may be used to execute one or more processes and methods in accordance with illustrative embodiments of the invention. Specifically, initiator 201, pin generation engine 203 and mobile phone 205 may include one or more hardware components of computing device 301.

The computer server 301 may have a processor 303 for controlling overall operation of the server and its associated components, including RAM 305, ROM 307, input/output module 309, and memory 315.

Input/output ("I/O") module 309 may include a microphone, keypad, touch screen, and/or stylus through which a user of server 301 may provide input, and may also include one or more of a speaker for providing audio output and a video display device for providing textual, audiovisual and/or graphical output. Software may be stored within memory 315 and/or storage to provide instructions to processor 304 for enabling server 301 to perform various functions. For example, memory 315 may store software used by server 301, such as an operating system 317, application programs 319, and an associated database 311. Alternately, some or all of server 301 computer executable instructions may be embodied in hardware or firmware (not shown). Database 311 may provide storage for the GUI. Database 311 may provide storage for the CAD. For example, database 311 may store information input into the GUI. Database 311 may provide storage for the CMT while the CMT is monitoring and recording user transactions.

Server 301 may operate in a networked environment supporting connections to one or more remote computers, such as terminals 341 and 351. Terminals 341 and 351 may be personal computers or servers that include many or all of the elements described above relative to server 301. The network connections depicted in FIG. 3 include a local area network (LAN) 325 and a wide area network (WAN) 329, but may also include other networks. When used in a LAN networking environment, computer 301 is connected to LAN 325 through a network interface or adapter 313. When used in a WAN networking environment, server 301 may include a modem 327 or other means for establishing communications over WAN 329, such as Internet 331. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages or screens via the World Wide Web from a web-based server. Any of various conventional web browsers can be used to display and manipulate data on web pages.

Additionally, application program 319, which may be used by server 301, may include computer executable instructions for invoking user functionality related to communication, such as email, short message service (SMS), and voice input and speech recognition applications.

Computing device 301 and/or terminals 341 or 351 may also be mobile terminals including various other components, such as a battery, speaker, and antennas (not shown).

A terminal such as 341 or 351 may be used by a user of the GUI to access and input information into the GUI, including information for creating one or more user groups, security groups, traversing rules, associating one or more user groups with one or more security groups and/or associating one or more traversing rules with one or more user groups, security groups or users. Information input into the GUI may be stored in memory 315. The input information may be processed by an application such as one of applications 319.

Figure 4:
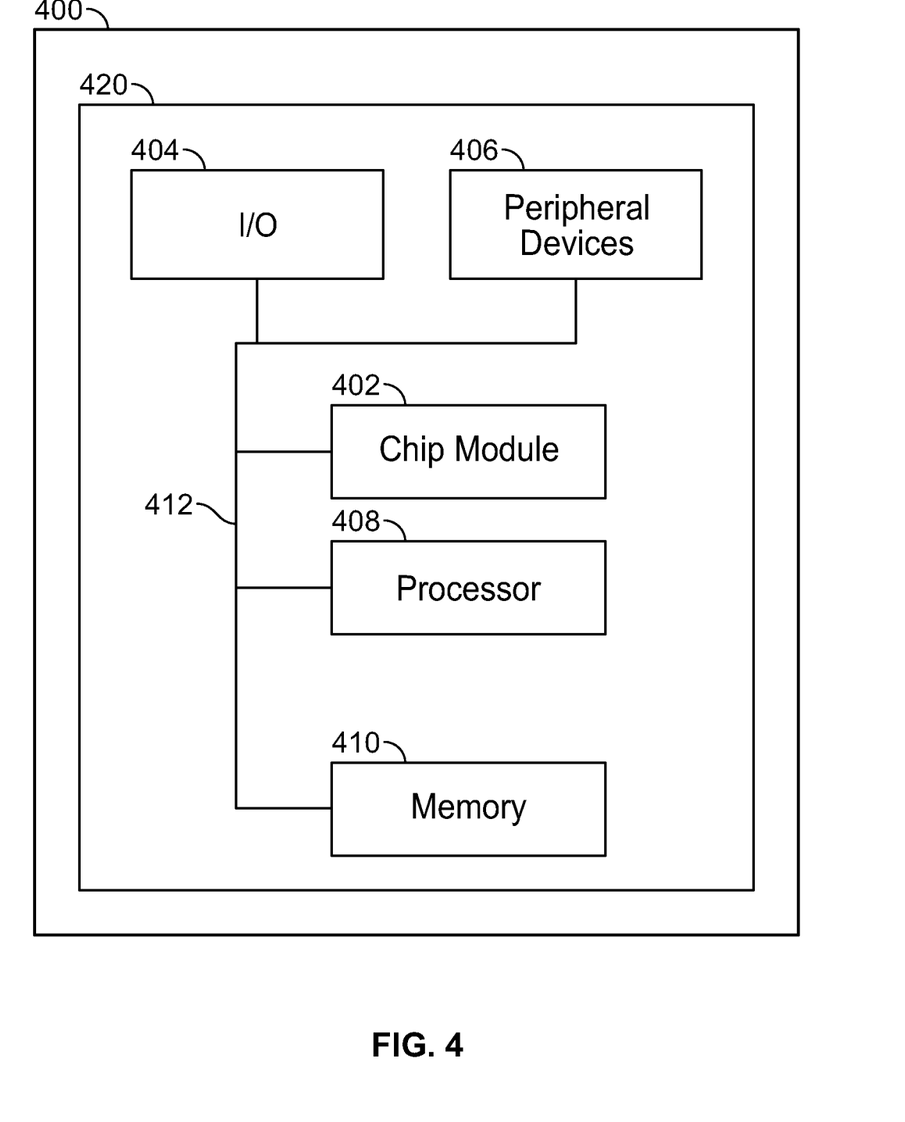
FIG. 4 shows illustrative apparatus in accordance with principles of the invention.

FIG. 4 shows an illustrative apparatus that may be configured in accordance with the principles of the invention. FIG. 4 shows illustrative apparatus 400. Initiator 201, pin generation engine 203 and mobile phone 205 may include one or more hardware components of apparatus 400 shown in FIG. 4.

Apparatus 400 may be a computing machine. Apparatus 400 may be included in apparatus shown in FIG. 3. Apparatus 400 may include chip module 402, which may include one or more integrated circuits, and which may include logic configured to perform any other suitable logical operations.

Apparatus 400 may include one or more of the following components: I/O circuitry 404, which may include the transmitter device and the receiver device and may interface with fiber optic cable, coaxial cable, telephone lines, wireless devices, PHY layer hardware, a keypad/display control device or any other suitable encoded media or devices; peripheral devices 406, which may include counter timers, real-time timers, power-on reset generators or any other suitable peripheral devices; logical processing device ("processor") 408, which may compute data structural information, structural parameters of the data, quantify indicies; and machine-readable memory 410.

Machine-readable memory 410 may be configured to store in machine-readable data structures information such as user groups, security groups, traversing rules, associations between user groups and security groups, associations between one or more traversing rules and one or more user groups, security groups and/or users, and any other suitable information or data structures.

Components 402, 404, 406, 408 and 410 may be coupled together by a system bus or other interconnections 412 and may be present on one or more circuit boards such as 420. In some embodiments, the components may be integrated into a single silicon-based chip.

It will be appreciated that software components including programs and data may, if desired, be implemented in ROM (read only memory) form, including CD-ROMs, EPROMs and EEPROMs, or may be stored in any other suitable computer-readable medium such as but not limited to discs of various kinds, cards of various kinds and RAMs. Components described herein as software may, alternatively and/or additionally, be implemented wholly or partly in hardware, if desired, using conventional techniques.

Various signals representing information described herein may be transferred between a source and a destination in the form of electromagnetic waves traveling through signal-conducting encoded media such as metal wires, optical fibers, and/or wireless transmission encoded media (e.g., air and/or space).

Apparatus 400 may operate in a networked environment supporting connections to one or more remote computers via a local area network (LAN), a wide area network (WAN), or other suitable networks. When used in a LAN networking environment, apparatus 400 may be connected to the LAN through a network interface or adapter in I/O circuitry 404. When used in a WAN networking environment, apparatus 400 may include a modem or other means for establishing communications over the WAN. It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to operate processor 408, for example over the Internet.

Apparatus 400 may be included in numerous general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, tablets, programmable consumer electronics, network PCs, minicomputers, mainframe computers, distributed computing environments that include any of the above systems or devices, and the like.

Thus, methods and apparatus for enhancing customer authentication and consent have been provided. Persons skilled in the art will appreciate that the present invention can be practiced by other than the described embodiments, which are presented for purposes of illustration rather than of limitation. The present invention is limited only by the claims that follow.

What is claimed is:

1. A method for generating a digital compliance record using mobile phone data and metadata to obtain authenticated digital consent, the method comprising:
   storing in a database:
      a digital identifier associated with a financial product or service;
      a consent text for the financial product or service, the consent text associated with the digital identifier;
      a first authentication protocol associated with the digital identifier, the first authentication protocol comprising a first plurality of authentication procedures; and
      a second authentication protocol associated with the digital identifier, the second authentication protocol comprising a second plurality of authentication procedures;
   using a first receiver, receiving a request to initiate a customer product offer, the request comprising a name and phone number provided by a customer;
   using a first processor, the first processor in communication with the database and a customer mobile device:
      retrieving the digital identifier stored in the database and associated with the product or service; and
      generating a one-time PIN ("OTP") that includes the digital identifier for the product or service;
   using a first transmitter, transmitting the OTP that includes the digital identifier for the product or service to the customer mobile device number;
   using a second processor, the second processor installed on the customer mobile device:
      in response to entry of the OTP comprising the digital identifier:
         determining that the customer mobile device is in the presence of the customer providing consent; and
         determining the digital identifier for the product or service from the OTP;
      retrieving a consent text for the product or service using the digital identifier for the product or service obtained from the OTP;
      retrieving the first authentication protocol using the digital identifier for the product or service obtained from the OTP, the first authentication protocol comprising a biometric scan and a first match threshold; and
      retrieving the second authentication protocol using the digital identifier for the product or service obtained from the OTP, the second authentication protocol not comprising a biometric scan and comprising accessing customer data stored on the mobile device, the second authentication protocol further comprising a second match threshold, the second match threshold higher than the first match threshold;
   using a second receiver, the second receiver installed on the customer mobile device:
      receiving a customer agreement to the consent text; and
      receiving customer selection of the first authentication protocol or the second authentication protocol; and
      associating the consent agreement and one or more authentication protocols with the digital identifier for the product or service; and
   using a second transmitter, the second transmitter installed on the mobile device, transmitting a digital compliance record to the database for storage, the digital compliance record comprising the digital identifier for the product or service, the consent agreement and one or more authentication protocol outputs.

2. The method of claim 1 further comprising storing, in the database, a plurality of identifiers, each identifier being associated with one of a plurality of products or services.

3. The method of claim 2 further comprising associating each of the identifiers with one or more authentication methods and one or more consent texts.

4. The method of claim 1 wherein the first authentication protocol comprises establishing a match between stored customer data and customer data resident on the mobile phone and establishing a match between stored customer biometric data and biometric data generated by the biometric scan.

5. The method of claim 4 further comprising, in response to receiving a customer selection of the first authentication protocol, using the second processor to determine that the customer has satisfied the first threshold, wherein satisfying the first threshold includes:
using the second processor to establish a match between the stored customer data and the customer data resident on the mobile phone; and
using the second processor to establish the match between the stored customer biometric data and the generated biometric data.

6. The method of claim 5 further comprising, in response to determining that the customer has satisfied the first threshold, transmitting an electronic offer to the customer, the electronic offer providing the customer an option to enroll in the product or service.

7. The method of claim 4 further comprising determining if the OTP was entered within a predetermined time period, the predetermined time period commencing after the transmission of the OTP to the customer mobile device.

8. The method of claim 1 wherein the second authentication protocol comprises establishing a match between stored customer data and customer data resident on the mobile phone.

9. The method of claim 8 further comprising, in response to receiving a customer selection of the second authentication protocol, using the second processor to determine that the customer has satisfied the second threshold, wherein satisfying the second threshold includes:
using the second processor to establish a match between the stored customer data and the customer data resident on the mobile phone;
using the second processor to establish a match between a phone number stored on a website profile associated with the customer and the customer phone number; and
using the second processor to establish a match between historical customer location data stored on the mobile phone and a customer address.

10. The method of claim 9 further comprising, in response to determining that the customer has satisfied the second threshold, transmitting an electronic offer to the customer, the electronic offer providing the customer an option to enroll in the product or service.

11. A system for generating a digital compliance record comprising authenticated digital consent, the system comprising:
a PIN generation engine configured to:
receiving an authentication request from an initiator, the authentication request including a customer name and a customer phone number; and
generating a one-time PIN ("OTP"), the OTP including an identifier associated with a product or service; and
transmit the OTP to a customer phone number;
a mobile phone configured to receive the OTP; and
an online application supported by the mobile phone and configured to:
authenticate the OTP, the authentication comprising verifying a match between the customer phone number and a mobile phone number associated with the mobile phone;
determine the identifier from the OTP;
retrieve, from a database, a first authentication method associated with the identifier;
retrieve from the database, a second authentication method associated with the identifier;
retrieve from the database a consent text associated with the identifier, wherein:
the first authentication method comprises a first authentication threshold and a biometric scan; and
the second authentication method comprises a second authentication threshold, the second authentication threshold being higher than the first authentication, the second authentication method not including the biometric scan;
receive a first customer selection evidencing the customer's agreement to terms and conditions included in the consent text;
receive a second customer selection of one of the first authentication method and the second authentication method;
authenticate the customer based on the selected one of the first and second authentication methods; and
store a digital compliance record comprising the identifier associated with the product or service, the consent agreement and one or more authentication outputs to the database.

12. The system of claim 11 wherein the online application is further configured to store, in the database, a plurality of identifiers, each identifier being associated with one of a plurality of products or services.

13. The system of claim 12 wherein the online application is further configured to associate each of the identifiers with one or more authentication methods and one or more consent texts.

14. The system of claim 11 wherein the first authentication threshold includes establishing a match between stored customer data and customer data resident on the mobile phone and establishing a match between stored customer biometric data and biometric data generated by the biometric scan.

15. The system of claim 14 wherein, when the online application receives a customer selection of the first authentication method, the online application is further configured to determine whether the customer has satisfied the first threshold, the satisfying the first threshold including:
comparing the stored customer data and the customer data resident on the mobile phone; and
comparing the stored customer biometric data and the generated biometric data.

16. The system of claim 15 wherein, when the online application has determined that the customer has satisfied the first threshold, the online application is configured to transmit an electronic offer to the customer, the electronic offer providing the customer an option to enroll in the product or service.

17. The system of claim 14 wherein the authentication of the OTP comprises determining if the OTP was received by the online application within a predetermined time period, the predetermined time period commencing after the transmission of the OTP to the customer mobile device.

18. The system of claim 11 wherein the second authentication threshold includes establishing a match between stored customer data and customer data resident on the mobile phone.

19. The system of claim 18 wherein, when the online application receives a customer selection of the second authentication method, the online application is further configured to determine whether the customer has satisfied the second threshold, the satisfying the second threshold comprising:

establishing a match between the stored customer data and the customer data resident on the mobile phone;

establishing a match between a phone number stored on a website profile associated with the customer and the customer phone number; and establishing a match between historical customer location data stored on the mobile phone and a customer address.

20. The system of claim 19 wherein, when the online application has determined that the customer has satisfied the second threshold, the online application is configured to transmit an electronic offer to the customer, the electronic offer providing the customer an option to enroll in the product or service.

* * * * *